United States Patent Office 3,562,787
Patented Feb. 9, 1971

3,562,787
FILM-FORMING COMPOSITION
Arthur B. Naselow, Philadelphia, Pa., assignor to E. I. du Pont de Nemours and Company, Wilmington, Del., a corporation of Delaware
No Drawing. Filed Dec. 22, 1966, Ser. No. 603,732
Int. Cl. C08g 51/26, 51/58
U.S. Cl. 260—30.2
2 Claims

ABSTRACT OF THE DISCLOSURE

A liquid film-forming composition containing a polyamide-imide polymer in solution in an organic liquid and containing a monofunctional cyclic anhydride, an aromatic or aliphatic aldehyde or a monofunctional isocyanate to prevent the composition from undergoing any undue increase in viscosity before it can be applied to a substrate under normal use conditions in the manufacture of heat-resistant polymeric films and coated articles.

---

This invention relates to a liquid film-forming composition, particularly to such a composition containing a polyamide-imide polymer as a film-former.

It is known in the polymer art that heat-resistant coatings and films can be made by preparing a solution in a suitable solvent of a polyamide-imide polymer, followed by applying a layer of the resulting solution film-forming composition to a substrate by conventional liquid-coating procedures, and then oven-drying the applied layer. However, the utility of previously known solution compositions of this type has been limited by their tendency towards premature gelling during storage, shipment or prolonged agitation or the viscosity becomes so high within a short time (e.g. a viscosity increase of well over 100%) as to make normal coating procedures impractical. Therefore, the industries which manufacture or use this type of composition are in need of a polyamide-imide liquid film-forming composition having improved retention of a workable viscosity.

The present invention provides a new and useful liquid composition which may be broadly defined as a solution of a polyamide-imide polymer in an organic liquid, said solution containing as a viscosity stabilizer a compound selected from the group consisting of monofunctional cyclic anhydrides, aromatic and aliphatic aldehydes, and monofunctional isocyanates, said stabilizer being present in said solution in an amount effective to enable the solution to retain a workable viscosity for a reasonable period of time.

Preferred polymers for use as the polyamide-imide polymer component of the novel composition are made up predominately of units of (a) methylene dianiline (sometimes referred to in the art as 4,4'-diamino-diphenyl-methane), meta-phenylene diamine, para-phenylene-diamine and oxydianiline (sometimes referred to in the art as 4,4'-diaminodiphenyl-ether), or mixtures of such diamines, and (b) trimellitic anhydride. As commonly used in the art, "units of" herein means units from the reaction of the materials listed. These and other useful polyamide-imide polymers and methods for making them are described in the following (the disclosures of which are incorporated herein by reference): U.S. Pat. 3,260,691 issued July 12, 1966 to Lavin et al., U.S. Pat. 3,179,635 issued Apr. 20, 1965 to Frost et al., Dutch patent application No. 6400422 published July 22, 1964 and U.S. patent applications Ser. No. 512,013 filed Dec. 6, 1965 by Naselow et al. and Ser. No. 472,314 filed July 15, 1965 by Sorenson. The polymers obtained by the S.N. 512,013 Naselow et al. method are especially preferred.

The composition contains an organic liquid solvent for the polyamide-imide polymer in an amount sufficient to provide the composition with the desired initial viscosity and polymer solids content. Among the more useful solvents are N-methylpyrrolidone, dimethylacetamide, dimethylformamide and dimethylsulfoxide. Organic liquids which are nonsolvents for the polymer (e.g., xylene and toluene) can also be added to the composition. Solvents and other liquids are used which are volatile in the sense that they can be evaporated at a temperature which does not cause harmful decomposition of the polymer.

The term polyamide-imide polymer in reference to the polymer present in the solution designates a polymer containing plain amide groups and at least some imide groups; amic acid (sometimes called amide acid) groups can also be present, but it is usually preferred to have more imide groups present than amic acid groups. When the liquid composition is dried and heat cured, the polymer becomes substantially infusible and insoluble through the formation of intra-chain and inter-chain amide and imide linkages as well as other possible linkages depending on the particular reactants used in preparing the polymer.

A preferred monofunctional cyclic anhydride for use as the viscosity stabilizer in the composition of this invention is phthalic anhydride. Among the other useful anhydrides are substituted phthalic anhydrides, naphthoic anhydride, substituted naphthoic anhydrides, cyclohexyl anhydride, cyclopentyl anhydride, and bicyclic compounds obtained by Diels Alder reaction of maleic anhydride with dienes (e.g., butadiene).

A preferred aldehyde for use as the viscosity stabilizer is benzaldehyde. Among the other useful aldehydes are para-nitrobenzaldehyde and other substituted benzaldehydes, acetaldehyde, propionaldehyde and butyraldehyde.

A preferred monofunctional isocyanate for use as the viscosity stabilizer is phenyl isocyanate. Among the other useful isocyanates are alkyl and halogen substituted phenyl isocyanates.

As indicated above, the viscosity stabilizer is present in the polymer solution in an amount effective to enable the solution to retain a workable viscosity for a reasonable period of time. One skilled in the art, in the light of the present disclosure, will have little difficulty in selecting the stabilizer content that gives a satisfactory improvement in viscosity stability or shelf-life at a reasonable cost for the particular components employed in the film-forming composition. The stabilizer content is usually about 0.1–25%, preferably about 0.3–10%, based on the weight of the polyamide-imide polymer present in the composition.

Additives known to be useful in polymeric film-forming compositions can be added to the composition in an amount that permits retention of the desired properties of the composition and films and other solid articles made therefrom, for example antioxidants, coloring agents, fire proofing agents, curing agents and antisettling agents. Conductive carbon black can be added, and the resulting composition can be used for the manufacture of flexible electrical heating elements and static electricity conductors.

The composition of this invention, especially when made from the preferred polymers, has surprisingly better capacity to retain a workable viscosity than similar known compositions in which there is none of the stabilizer compound employed in this invention. The composition can be stored or agitated for a reasonable period of time without gelling or becoming so viscous as to render it useless as a liquid film-forming composition; for example, a viscosity increase of over 100% is easily avoided in the storage period required in most commercial operations.

The novel composition is useful for the manufacture of heat-resistant polymeric films, for the manufacture of electrical insulation materials by the impregnation of glass fabrics and other porous substrates, and especially for the application of adherent coatings to electrical conductors (e.g., copper wire), particularly when there is need for a coating having excellent heat resistance, toughness and electrical insulation properties. Compositions are readily obtainable in accordance with this invention which are very useful as high temperature resistant (e.g., class H) wire enamel.

A layer of the composition can be applied to various types of substrates by any suitable coating method, for example by conventional knife spreading, dipping, brushing or roller coating. The wet layer is heated to remove the volatile components and to cure the polymer.

The examples which follow are given for the purpose of illustrating the invention. All quantities shown are on a weight basis unless otherwise indicated.

EXAMPLE 1

A liquid film-forming composition adapted for use as a class H wire enamel is prepared by:

(a) Charging a reaction vessel with equimolar amounts of the reactants methylene dianiline and trimellitic anhydride along with enough of the solvent N-methylpyrrolidone to provide a reaction mixture in which the ratio of reactants to solvent is 35:65, (b) Heating the reaction mixture at 220° C. for 1.5 hours with distillation of solvent, (c) Adding the catalyst boric acid in an amount equal to 1% by weight of the reactants, (d) Heating the reaction mixture at 220° C. for an additional 5.75 hours with distillation of solvent, the contents of the vessel containing 30% of solvent at the end of this period, and the polymer having an inherent viscosity of 0.81 as measured in a 0.5% solution in distilled N-methylpyrrolidone at 27° C., (e) Diluting the resulting polyamide-imide polymer solution by adding hot N-methylpyrrolidone in an amount sufficient to provide a solution having a polymer:solvent weight ratio of 21:79, and (f) Adding phthalic anhydride to the resulting polymer solution in an amount equal to 5% by weight of the polymer.

The resulting film-forming composition has a Brookfield LVD viscosity of 40 poises as measured on the freshly-formed composition at 25° C. with a No. 3 spindle at 12 r.p.m. (all Brookfield viscosity values listed below are measured in the same manner).

After the film-forming composition is stored for 40 days at 49° C., it has a Brookfield viscosity of 30 poises at 25° C. The composition can be used for coating copper wire by conventional wire-coating methods, for example by passing the wire through a tank filled with the liquid composition, passing the dipped wire through a vertical oven to dry and cure the coating, and repeating this procedure until the polymeric coating on the wire has the desired thickness. Adherent coatings having excellent dielectric properties are obtainable in this manner which are substantially insoluble and infusible as well as tough and flexible.

EXAMPLE 1A

For purposes of comparison a film-forming composition outside the scope of the present invention is prepared by repeating Example 1 except step (f) is omitted. The Brookfield viscosity of the freshly-formed composition is 40 poises. After the composition is stored for 3 days at 49° C., it has poor utility as a liquid film-forming composition since its Brookfield viscosity is 500 poises at 25° C. After it is stored for a total of 10 days at 49° C., the composition has no utility whatever as a liquid film-forming composition since it is now a gel.

EXAMPLE 2

A liquid film-forming composition which is useful as a class H wire enamel is prepared by repeating Example 1 except the amount of phthalic anhydride added in step (f) is 3% by weight of the polymer. The Brookfield viscosity of the freshly-formed composition is 90 poises. After it is stored for 2 days at 49° C., the Brookfield viscosity is 140 poises at 25° C.

EXAMPLE 2A

For purposes of comparison, a composition is prepared by repeating Example 2 except step (f) (the addition of phthalic anhydride) is omitted. After the composition is stored for 2 days at 49° C., it has a Brookfield viscosity of 300 poises at 25° C.

EXAMPLE 3

A liquid film-forming composition which is useful as a class H wire enamel is prepared by repeating Example 1 except step (f) consists of adding benzaldehyde to the polymer solution in an amount equal to 3% by weight of the polymer. The Brookfield viscosity of the freshly-formed composition is 85 poises. After it is stored for 40 days at 49° C., the Brookfield viscosity is 74 poises at 25° C.

A composition having similar utility and storage stability can be prepared by repeating Example 3 except for replacing the benzaldehyde with para-nitrobenzaldehyde.

EXAMPLE 3A

For purposes of comparison, a composition is prepared by repeating Example 3 except step (f) (the addition of benzaldehyde) is omitted. After the composition is stored for 2 days at 49° C., the Brookfield viscosity is 300 poises at 25° C.; after it is stored for 4 days at 49° C., it is gelled.

EXAMPLE 4

A liquid film-forming composition which is useful as a class H wire enamel is prepared by repeating Example 1 except step (f) consists of adding phenyl isocyanate to the polymer solution in an amount equal to 5% by weight of the polymer. The Brookfield viscosity of the freshly-formed composition is 90. After the composition is stored for 4 days at 49° C., the Brookfield viscosity is 107 poises at 25° C.

EXAMPLE 4A

For purposes of comparison, a composition is prepared by repeating Example 4 except step (f) (the addition of phenyl isocyanate) is omitted. After the composition is stored for 4 days at 49° C., it is gelled.

I claim:

1. As a new and useful liquid film-forming composition, a solution of a polyamide-imide polymer in an organic liquid, said solution containing as a viscosity stabilizer a compound selected from the group consisting of monofunctional cyclic anhydrides, said stabilizer being present in said solution in an amount equal to about 3–10% based on the weight of said polymer; said polymer consisting essentially of units of (a) a diamine selected from the group consisting of methylene dianiline, meta-phenylene diamine, paraphenylene diamine and oxydianiline, and (b) trimellitic anhydride.

2. A composition according to claim 1 wherein said stabilizer is phthalic anhydride.

References Cited

UNITED STATES PATENTS

| | | | |
|---|---|---|---|
| 3,249,561 | 5/1966 | Hendrix | 260—2.5 |
| 3,360,502 | 12/1967 | Loncrini | 260—78 |
| 3,242,128 | 3/1966 | Chalmers | 260—32.6 |
| 3,249,561 | 5/1966 | Hendrix | 260—2.5 |
| 3,277,043 | 10/1966 | Holub | 260—33.4 |

MORRIS LIEBMAN, Primary Examiner

R. ZAITLEN, Assistant Examiner

U.S. Cl. X.R.

260—30.8, 32.6, 32.8, 78